Figure 5:
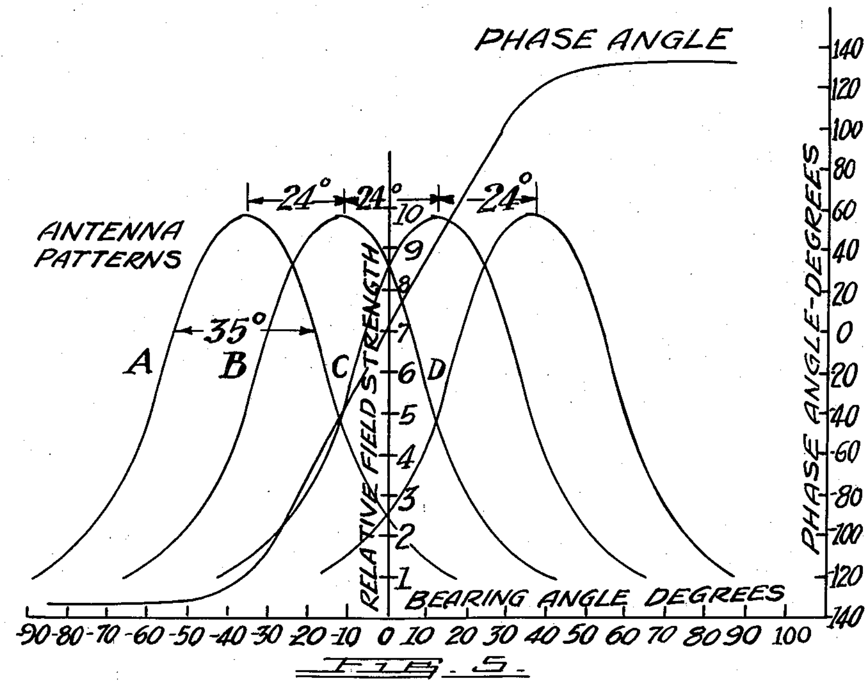

Jan. 24, 1961 E. A. SEAMAN 2,969,541
DIRECTION FINDING APPARATUS
Filed Sept. 8, 1958 2 Sheets-Sheet 1
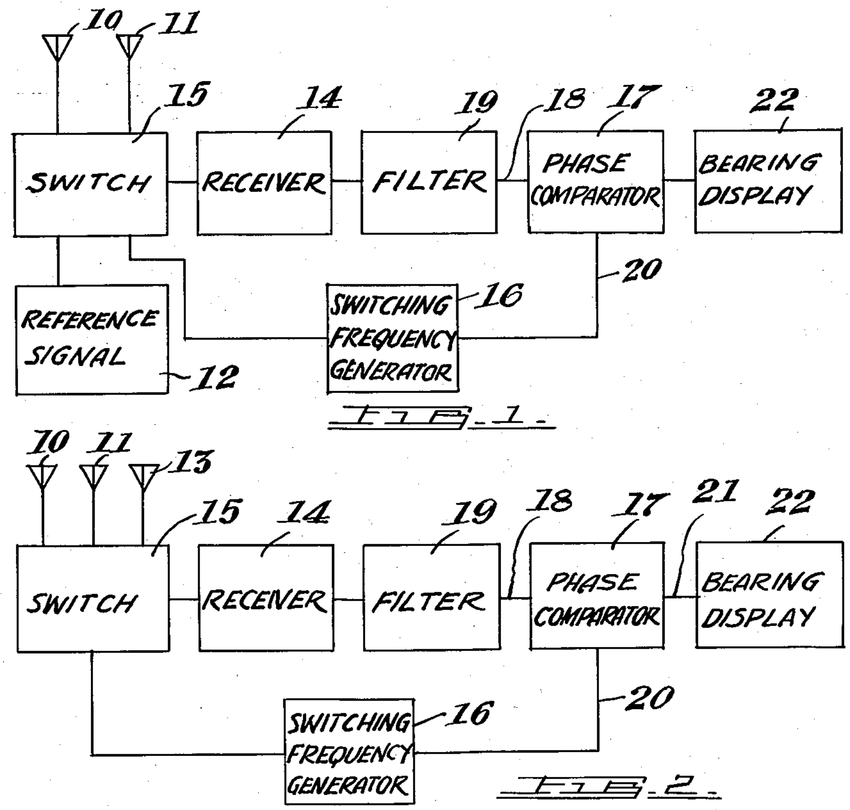
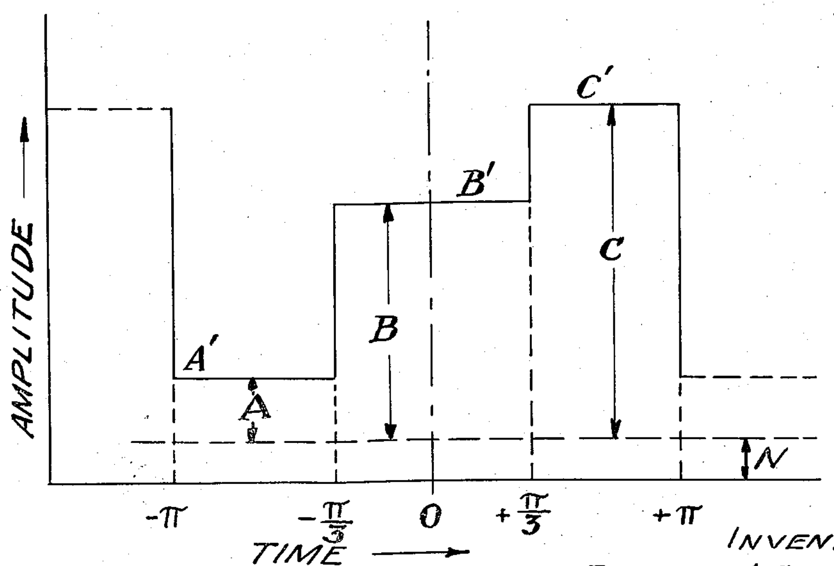
INVENTOR
ERNEST A. SEAMAN
By- Smart & Biggar
ATTORNEYS Jan. 24, 1961 E. A. SEAMAN 2,969,541

DIRECTION FINDING APPARATUS

Filed Sept. 8, 1958 2 Sheets-Sheet 2

INVENTOR
ERNEST A. SEAMAN

By Smart & Biggar
ATTORNEYS

United States Patent Office 2,969,541

Patented Jan. 24, 1961

2,969,541

DIRECTION FINDING APPARATUS

Ernest Alvin Seaman, Ottawa, Ontario, Canada, assignor to Her Majesty the Queen in right of Canada as represented by the Minister of National Defence Filed Sept. 8, 1958, Ser. No. 759,487

4 Claims. (Cl. 343—120)

The invention relates to direction finding apparatus for determining the direction of a source of radiation in the presence of ambient random radiation. The invention is particularly applicable to radio direction finding systems and can be used to determine the bearing of a source of an electromagnetic radiation.

Radio direction finding systems have been given a good deal of attention ever since the development of radio communication. One well known system used four directional antennas mounted at right angles to one another and a cathode ray tube having four deflection plates was used to display bearing information. Each of the deflection plates was connected to a separate antenna so that received signals caused deflection of a focused spot on the screen of the cathode ray tube, thereby indicating the direction of the source of radiation. The main difficulty with such a system is the lack of sensitivity. This can be improved by inserting a radio receiver into each of the four channels between the antenna and the deflection plate of the cathode ray tube. However, such a system becomes unusable when the signal level drops to the level of the background noise. This difficulty with background noise has been a serious drawback in other direction finding systems, until the present inventor discovered how to avoid interference from background noise and to obtain direction bearings even under circumstances when the general background noise may be greater than the signal itself.

The present inventor has discovered that this difficulty with signal to noise ratio can be overcome by using a plurality of unidirectional radiation sensing elements fixed relatively to each other and having partly overlapping sensing patterns and by cyclically sampling the energy received by each of the sensing elements so that the output of the sampling device is of fixed frequency but of a phase determined by the relative amplitudes of the signals received at each individual sensing element. The phase of the output signal from the sampling device is then determined and can be displayed by a bearing display to indicate the direction of the source of radiation.

According to the invention direction finding apparatus for determining the direction of a source of radiation in the presence of uniformly distributed ambient random radiation comprises at least two unidirectional radiation sensing elements fixed relatively to each other and having partly overlapping sensing patterns and a source of power adapted to supply power equivalent to the ambient random radiation. Receiving means for the radiation and for the ambient random radiation is connected by switch means operated at a predetermined frequency to the sensing elements and to the source one at a time in turn. The output of the receiver is fed through a narrow band filter tuned to the predetermined frequency at which the switching means is operated and the output of the filter forms one of the inputs of a phase comparator. The other input of the phase comparator is a signal of the same frequency and phase as the predetermined frequency at which the switch is operated. The phase comparator is adapted to compare the phases of the signals at its inputs to produce an output signal dependent on phase differences. Means are provided to derive an indication of the phase differences from the output signals of the phase comparator and this may be displayed to indicate the bearing of the source of radiation. The source of power equivalent to the ambient random radiation may be replaced by one or more unidirectional sensing elements fixed relatively to the other two and having a partly overlapping sensing pattern therewith.

In the application of the direction finding apparatus according to the invention to a radio direction finding system, the unidirectional radiation sensing elements would be broad beam antennas sensitive to electromagnetic radiation and the source of power would be adapted to supply power equivalent to the ambient thermal radiation. It may be preferred to use one or more broad beam antennas fixed relatively to the other two and having a partly overlapping radiation receiving pattern in place of the source of power adapted to supply power equivalent to the ambient thermal radiation.

It is an important advantage of the present invention that the nature of the radiated signal of which a bearing is to be obtained is not critical. It may be a general noise signal, a continuous wave signal or a modulated wave signal provided the modulation frequency does not coincide with the switching frequency. Another important advantage of a system in accordance with the invention is its relative independence of signal to noise ratio even when the signal itself is a noise signal. The latter advantage results from the fact that the output signal of the receiver is only dependent on the total relative signal levels received by the unidirectional sensing elements and therefore, the general background noise level will have no effect on the phase of the signal which appears at the output of the narrow band filter. Consequently this system can be used even when the signal to noise ratio is considerably less than unity to determine the direction of a radiating source and it is not necessary to know the nature of the radiation.

The invention will be further described with reference to the accompanying drawings in which:

Figures 1 and 2 are block diagrams of direction finding apparatus in accordance with the invention, Figure 3 is a graph representing the output signal of the receiver shown in Figures 1 and 2, and Figures 4 and 5 are graphs representing antenna patterns.

The direction finding apparatus shown in Figure 1 comprises two unidirectional broad-beam antennas 10 and 11 having partly overlapping patterns and a source of a reference signal 12 which is adapted to supply power equivalent to ambient thermal radiation. As shown in Figure 2, the reference signal source 12 may be replaced by a third unidirectional broad-beam antenna 13; otherwise the two block diagrams of Figures 1 and 2 are the same and the same reference numerals will be used for corresponding parts. A receiver 14 is connected to the antennas 10 or 11 and the reference signal source 12 (Figure 1) or the antenna 13 (Figure 2) through a cyclic switch 15 which repeatedly at a predetermined frequency connects the input of the receiver to the antennas 10 and 11, the reference signal source 12 or the antenna 13 one at a time in turn. The predetermined frequency at which the cyclic switch 15 operates is determined by a switching frequency generator 16. A phase comparator 17 has one of its inputs 18 connected through a narrow band pass filter 19 to the output of the receiver 14. The other input 20 of the phase comparator 17 is connected to the switching frequency generator 16 so that the input 20 is fed with a signal of the same frequency and phase as the signal which controls the cyclic operation of the switch 15. The output 21 of the phase comparator is connected to a bearing display 22.

As shown by Figures 1 and 2, a direction finding system according to the invention uses two or more broad-beam fixed antennas with overlapping patterns and a receiver which has its input switched in sequence between the antennas. In the case of the two antenna systems shown in Figure 1, a dummy antenna may be used as the source 12 of reference signal. The output of the receiver 14 is put through a narrow-band pass filter 19 tuned to the switch frequency of the switch 15. When a signal is received the filter 19 output is a sine wave, the phase of which, relative to the antenna switching cycle, is dependent on the bearing of the received signal, and it is a feature of a system according to the present invention that the phase of the receiver output is used to indicate bearing.

As shown graphically in Figure 3, a system using three antennas (Figure 2), has a receiver input consisting of three power levels corresponding to the signal powers received by each of the antennas 10, 11, 13, plus the ambient noise power received by each of the antennas and the receiver noise in terms of equivalent noise at the input. N, the ambient noise plus the receiver noise is constant, or varies at a rate slow compared with the switching rate. The three power levels, A, B and C, received by the antennas from the unknown signal source, are determined by the antenna patterns and the position of the signal source. The total power inputs in the three parts of the cycle, A′, B′ and C′, are the result of adding the background noise N to the received signals A, B and C, and assuming a linear receiver, this waveform appears at the output of the receiver.

A Fourier analysis of this waveform yields an output at the switching frequency of the form:

$$f=\frac{\sqrt{3}(2B'-A'-C')}{2\pi}\cos\omega t+\frac{3(C'-A')}{2\pi}\sin\omega t$$

where $\omega/2\pi$ is the switching frequency and $A'=A+N$. The background noise, N, can be eliminated from this expression, and the phase angle $\phi$, relative to the original switching cycle, is given by:

$$\phi=\tan^{-1}\frac{\sqrt{3}(C-A)}{2B-A-C}$$

The important feature of this function is that its magnitude is independent of the strength of the received signal, whether it is much below the noise level, or many times greater.

This basic three part switching cycle can be further modified by altering the relative time that the receiver is connected to each of the three antennas. If the A and C parts are each made 135° wide and part B 90° wide, the phase angle is given by:

$$\phi=\tan^{-1}\frac{(1+\sqrt{2})(C-A)}{2B-A-C}$$

If the A and C parts are each made 90° wide, and the B part 180° wide, the phase angle is given by:

$$\phi=\tan^{-1}\frac{(C-A)}{2B-A-C}$$

Figure 4:
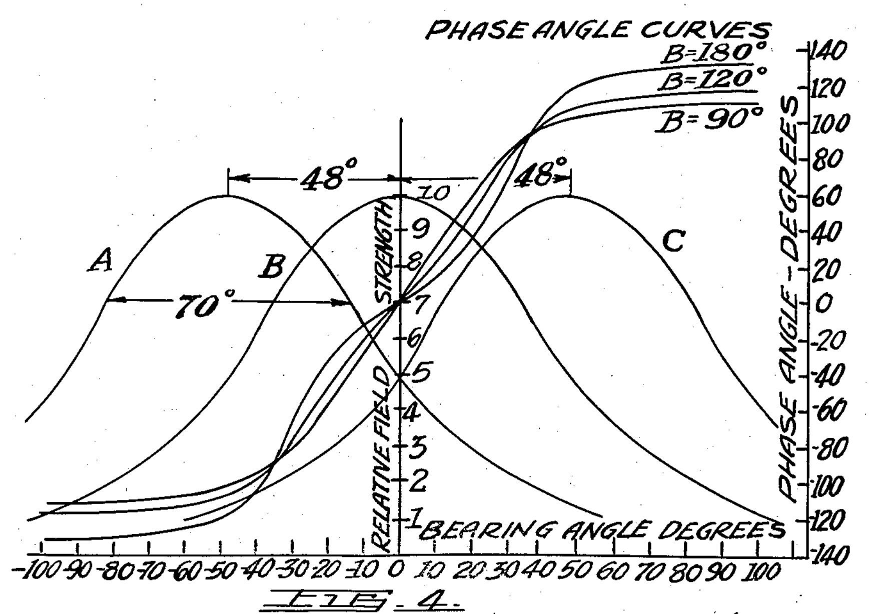

Figure 4 illustrates the results which could theoretically be obtained from a typical case. The antenna configuration chosen in this example is three antennas with beam widths of 70° at the half power points, with the antenna patterns separated by 48°. The bearing vs. phase angle curve is changed to some extent by variation of the relative widths of the three parts of the cycle, and further changes can be made by varying the separation of the antennas, or by changing the shape of the antenna patterns.

It is not possible to use two antennas in a two part switching cycle and use the phase of the output as a measure of bearing, since the phase angle is either +90° or −90° depending on which side of the antenna crossover point the signal is coming from. However, it is possible to use two antennas in a three part cycle if a dummy antenna is used for the third part of the cycle (Figure 1). The dummy antenna in this case must have a power output equal to the ambient noise power received by the antennas in the absence of a signal from some definite source. If the desired signal is large compared with the ambient noise level, the error introduced by the use of a dummy antenna having a power output not quite equal to the ambient noise level is negligible.

If the dummy antenna is used in the B part of the original three part cycle, then B′ is equal to N, and this makes it possible to subtract the N component from the A′ and C′ terms. The resulting expression for the fundamental is now:

$$f=\frac{\sqrt{3}(-A-C)}{2\pi}\cos\omega t+\frac{3(C-A)}{2\pi}\sin\omega t$$

and the phase angle for this expression is given by:

$$\phi=\tan^{-1}-\frac{\sqrt{3}(C-A)}{A+C}$$

As in the original system, it is also possible to alter the relative width of the various parts of the cycle. If the A and C parts are each made 135° wide, and the B part 90°, the phase angle is given by:

$$\phi=\tan^{-1}-\frac{(1+\sqrt{2})(C-A)}{A+C}$$

And if the A and C parts are each made 90° wide, and the B part 180° wide, the phase angle is given by $$\phi=\tan^{-1}-\frac{C-A}{C+A}$$

The analysis can be extended to a four antenna system in which the power levels received by the four antennas are given by A, B, C and D. The phase angle of the output at the switching frequency in the case for a switching cycle with four parts of equal width is given by:

$$\phi=\tan^{-1}\frac{(C-A)-(B-D)}{(C-A)+(B-D)}$$

Again this function is independent of signal strength.

An example is given for this system in Figure 5. In this case the beam widths chosen are 35° and the separation between the beams is 24°. As in the previous system, variation in the shape of the bearing vs. phase angle curve can be brought about by varying the relative widths of the four parts of the cycle, the separation of the antenna patterns, and the pattern shapes.

Although no further examples are included for switching cycles with more than four antennas, the same principles apply, and any number of antennas can be used. The maximum bearing coverage that can be obtained in a given case is determined by the number of antennas used and the beam width of these antennas. By using a sufficient number of antennas of any beam width with suitable separation between the patterns, it is possible to obtain a full 360° bearing coverage, and make the phase angle of the output wave equal to the bearing angle.

What is claimed as my invention is:

1. Direction finding apparatus for determining the direction of a source of radiation in the presence of ambient random radiation, comprising at least two unidirectional radiation sensing elements fixed relatively to each other and having partly overlapping sensing patterns, a source of power adapted to supply power equivalent to said ambient random radiation, receiving means for said radiation and said ambient random radiation and having an input and an output, switch means adapted to connect repeatedly at a predetermined frequency the said sensing elements and said source one at a time in turn to the input of said receiving means, a narrow-band filter tuned to said predetermined frequency and connected to the output of said receiving means, a phase comparator having as inputs the output from said filter and a signal of the same frequency and phase as said predetermined frequency, said phase comparator being adapted to compare the phases of the signals at its inputs to produce an output signal dependent on phase differences, and means to derive an indication of said phase differences from the output signal of the phase comparator.

2. Direction finding apparatus as claimed in claim 1 in which the source of power equivalent to said ambient random radiation is a third unidirectional radiation sensing element fixed relatively to the other two and having a partly overlapping sensing pattern therewith.

3. Direction finding apparatus as claimed in claim 1 for determining the direction of a source of electromagnetic radiation in the presence of ambient thermal radiation in which the unidirectional radiation sensing elements are broad-beam antennas sensitive to electromagnetic radiation and the source of power is adapted to supply power equivalent to said ambient thermal radiation.

4. Direction finding apparatus as claimed in claim 3 in which the source of power adapted to supply power equivalent to the ambient thermal radiation is a third broad-beam antenna fixed relatively to the other two and having a partly overlapping radiation receiving pattern.

References Cited in the file of this patent

UNITED STATES PATENTS 2,651,774 Earp ------------------- Sept. 8, 1953